US008190356B2

(12) United States Patent
Sakata

(10) Patent No.: US 8,190,356 B2
(45) Date of Patent: May 29, 2012

(54) NAVIGATION APPARATUS, POSITION REGISTERING METHOD, POSITION REGISTERING PROGRAM, AND RECORDING MEDIUM

(75) Inventor: Daisuke Sakata, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 849 days.

(21) Appl. No.: 12/294,370

(22) PCT Filed: Mar. 16, 2007

(86) PCT No.: PCT/JP2007/055372

§ 371 (c)(1), (2), (4) Date: Sep. 24, 2008

(87) PCT Pub. No.: WO2007/122926

PCT Pub. Date: Nov. 1, 2007

(65) Prior Publication Data

US 2009/0164119 A1 Jun. 25, 2009

(30) Foreign Application Priority Data

Mar. 24, 2006 (JP) ................................ 2006-084098

(51) Int. Cl.
*G01C 21/00* (2006.01)

(52) U.S. Cl. ....................................... 701/400; 701/417

(58) Field of Classification Search .................. 701/200, 701/201, 205, 207

See application file for complete search history.

(56) References Cited

U.S. PATENT DOCUMENTS 6,125,323 A * 9/2000 Nimura et al. ................ 701/207
6,192,314 B1 2/2001 Khavakh et al.
7,630,830 B2 * 12/2009 Watanabe ..................... 701/200
7,940,194 B2 * 5/2011 Goto et al. ................. 340/932.2
2002/0133292 A1 9/2002 Miyaki
2002/0169552 A1 * 11/2002 Hashida ........................ 701/213
2003/0139880 A1 * 7/2003 Leimbach et al. ............ 701/217
2004/0220729 A1 * 11/2004 Park et al. ..................... 701/209
2006/0058945 A1 * 3/2006 Watanabe ...................... 701/200
2007/0021910 A1 * 1/2007 Iwami et al. .................. 701/210

FOREIGN PATENT DOCUMENTS

JP 11-23302 1/1999
JP 2003-14479 1/2003
JP 2004-012425 1/2004

OTHER PUBLICATIONS

Extended European Search Report dated Mar. 7, 2011, in the corresponding European Application.

* cited by examiner

*Primary Examiner* — James Trammell
*Assistant Examiner* — Michael D Lang
(74) *Attorney, Agent, or Firm* — Young & Thompson

(57) ABSTRACT

In a navigation apparatus, an acquiring unit acquires traveling state information indicating a traveling state of a mobile object. A position identifying unit identifies a current position of the mobile object based on the traveling state information and map information. The destination setting unit sets a destination. A route searching unit searches for a route based on the destination. A route guidance unit performs route guidance based on the route. A parking determining unit determines whether the mobile object is parked. If during the route guidance, the current position of the mobile object identified to be on a road within a first predetermined range from the destination is identified not to be on any road and it is determined that the mobile object is parked, a registering unit registers the most recent deviation point as an entrance point of a parking lot of the destination into a storage unit.

9 Claims, 6 Drawing Sheets

NAVIGATION APPARATUS, POSITION REGISTERING METHOD, POSITION REGISTERING PROGRAM, AND RECORDING MEDIUM

TECHNICAL FIELD

The present invention relates to a navigation apparatus, a position registering method, a position registering program, and a recording medium capable of automatically registering a parking lot entrance point, etc., based on a specified current position of a mobile object.

BACKGROUND ART

Conventionally, an information providing apparatus is known that includes, for example, a current position calculating unit calculating a current position; a parking lot information acquiring unit acquiring parking lot information from the current position calculated by the current position calculating unit and parking lot location information read from a map information storage unit; and a route searching unit performing route searching taking into account entrances and exits based on the information from the parking lot information acquiring unit and a map data storage unit.

This information providing apparatus further includes the map information storage unit storing map information and parking lot information; a display control unit performing control for displaying a result of a route search by the route searching unit taking into account entrances and exits; and a display unit controlled by the display control unit and displaying the result of the route search taking into account entrances and exits and is configured to be capable of providing effective information taking into account entrances and exits of facilities such as parking lots (see, e.g., Patent Document 1).

Patent Document 1: Japanese Patent Application Laid-Open Publication No. 2004-12425

DISCLOSURE OF INVENTION

Problem to be Solved by the Invention

However, in the case of the information providing apparatus of the conventional art described in Patent Document 1, if the route retrieving unit retrieves a route to a parking lot when an entrance point to the parking lot is not recorded in the map information, the parking lot information. etc., only a route to the vicinity of the parking lot can be retrieved. Therefore, even if one can somehow arrive at the vicinity of the parking lot, it is problematic in that an entrance of the parking lot can not immediately be identified and that the entrance of the parking lot must be searched for after arrival, posing a significant inconvenience, for example.

Although it is conceivable to preliminarily record entrance points of parking lots for all the parking lots included in map information, parking lot information, etc., it is problematic in that data edit operations, etc., become very difficult due to an increase in the amount of recorded data, resulting in increased product cost, for example.

Although it is conceivable that entrance points and exit positions are embedded in map information, parking lot information, etc., through operation and input by a user for parking lots utilized by the user, it is problematic in that associated input operations are troublesome for the user and improved convenience cannot be expected, for example.

Means for Solving Problem

To solve the problems above and achieve an object, a navigation apparatus according to the invention of claim 1 includes an acquiring unit that acquires traveling state information indicating a traveling state of a mobile object; a position identifying unit that identifies a current position of the mobile object based on the traveling state information and map information; a destination setting unit that sets a destination; a route searching unit that searches for a route based on the destination; a route guidance unit that performs route guidance based on the route; a parking determining unit that determines whether the mobile object is parked; and a registering unit that registers into a storage unit, a deviation point from a road as an entrance point of a parking lot of the destination when the mobile object is determined to be parked after the mobile object is identified to be on a road within a first predetermined range from the destination and is subsequently identified not to be on any road. The registering unit, for one destination, registers into the storage unit, only a most recent deviation point as the entrance point of the parking lot of the one destination while the route guidance is in progress.

A navigation apparatus according to the invention of claim 5 includes an acquiring unit that acquires traveling state information indicating a traveling state of a mobile object; a position identifying unit that identifies a current position of the mobile object based on the traveling state information and map information; a destination setting unit that sets a destination; a route searching unit that searches for a route based on the destination; a route guidance unit that performs route guidance based on the route; a parking determining unit that determines whether the mobile object is parked; and a registering unit that registers into a storage unit, a deviation point from a road as an entrance point of a parking lot of the destination when the mobile object is determined to be parked after the mobile object is identified to be on a road within a first predetermined range from the destination and is subsequently identified not to be on any road. The registering unit, while the route guidance is in progress, erases the entrance point of the parking lot of the destination registered in the storage unit during the route guidance if the mobile object is determined to be parked when the mobile object is identified to be on a road within a second predetermined range smaller than the first predetermined range from the destination.

A position registering method according to the invention of claim 6 is position registering method of a navigation apparatus including a destination setting unit, a route searching unit that searches for a route based on a destination, and a route guidance unit that performs route guidance based on the route. The position registering method includes an acquiring step of acquiring traveling state information indicating a traveling state of a mobile object; a position identifying step of identifying a current position of the mobile object based on the traveling state information and map information; a saving step of temporarily saving a deviation point from a road when the mobile object identified to be on the road is subsequently identified not to be on any road; a parking determining step of determining whether the mobile object is parked when the mobile object is identified not to be on any road; and a registering step of registering the deviation point as an entrance point to a parking lot of the destination when the deviation point is within a predetermined range from the destination and the mobile object is determined to be parked. The registering step includes, for one destination, registering into the storage unit, only a most recent deviation point as the entrance point of the parking lot of the one destination while the route guidance is in progress.

A position registering method according to the invention of claim 7 is a position registering method of a navigation apparatus including a destination setting unit, a route searching unit that searches for a route based on a destination, and a route guidance unit that performs route guidance based on the route. The position registering method includes an acquiring step of acquiring traveling state information indicating a traveling state of a mobile object; a position identifying step of identifying a current position of the mobile object based on the traveling state information and map information; a saving step of temporarily saving a deviation point from a road when the mobile object identified to be on the road is subsequently identified not to be on any road; a parking determining step of determining whether the mobile object is parked when the mobile object is identified not to be on any road; and a registering step of registering the deviation point as an entrance point to a parking lot of the destination when the deviation point is within a first predetermined range from the destination and the mobile object is determined to be parked. The registering step includes, while the route guidance is in progress, erasing the entrance point registered in the storage unit during the route guidance if the mobile object is determined to be parked when the mobile object is identified to be on a road within a second predetermined range smaller than the first predetermined range from the destination.

A position-registering computer program according to the invention of claim 8 causes a computer to execute the position registering method according to claim 6 or 7.

A computer-readable recording medium according to the invention of claim 9 stores therein the position-registering computer program according to claim 8.

EXPLANATIONS OF LETTERS OR NUMERALS

Figure 1:
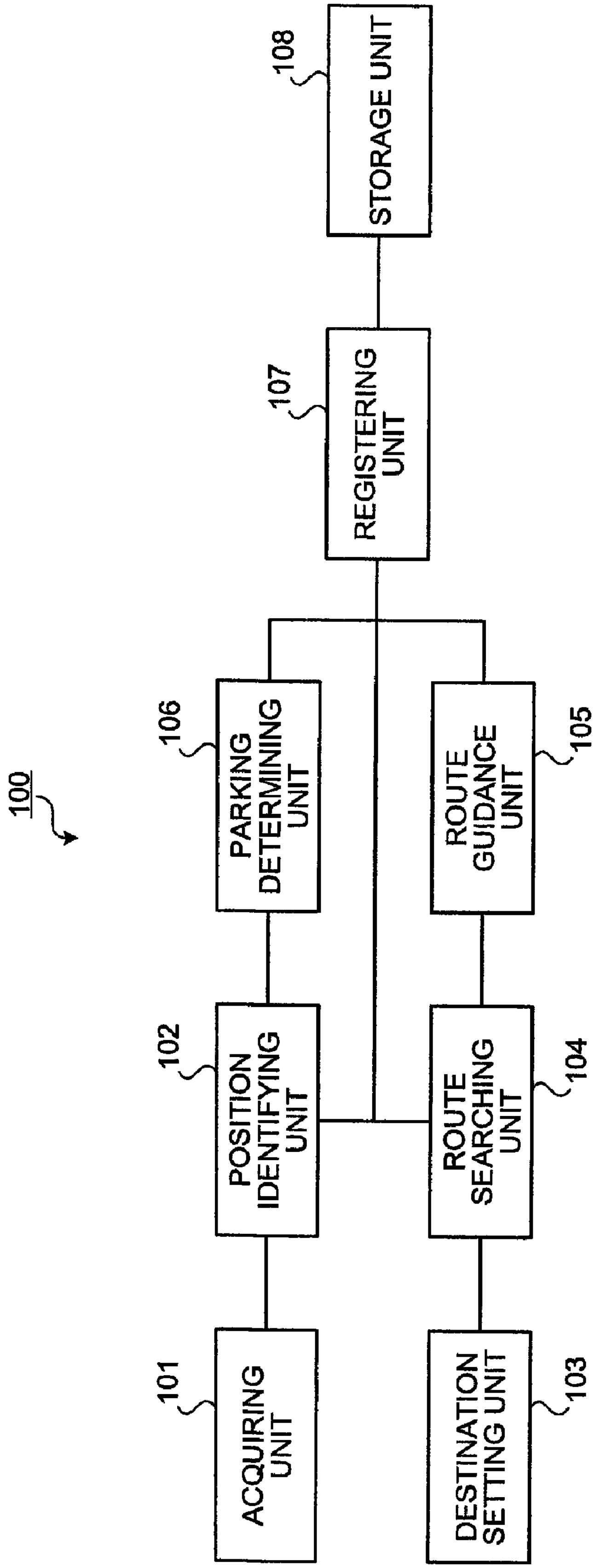
FIG. 1 is a block diagram of a functional configuration of a position registering apparatus according to the embodiment.

100, 300 navigation apparatus
101 acquiring unit
102 position identifying unit
103 destination setting unit
104 route searching unit
105 route guidance unit
106 parking determining unit
107 registering unit
108 storage unit

BEST MODE(S) FOR CARRYING OUT THE INVENTION

A preferred embodiment is described for a navigation apparatus, a position registering method, a position registering program, and a recording medium according to the present invention with reference to the accompanying drawings.

Embodiment

Functional Configuration of Navigation Apparatus

A functional configuration of a navigation apparatus according to the embodiment is described with reference to FIG. 1. FIG. 1 is a block diagram of a functional configuration of a position registering apparatus according to the embodiment. As shown in FIG. 1, a navigation apparatus 100 includes an acquiring unit 101, a position identifying unit 102, a destination setting unit 103, a route searching unit 104, a route guidance unit 105, a parking determining unit 106, a registering unit 107, and a storage unit 108.

The acquiring unit 101 acquires traveling state information indicating the traveling state of a mobile object. The traveling state information is information including position information, velocity information, and traveling direction information concerning the mobile object, for example. The traveling state information is calculated with the use of signals received from GPS satellites by a GPS receiver mounted on the mobile object or values output from various sensors disposed on the mobile object.

The position identifying unit 102 identifies the current position of the mobile object based on the traveling state information acquired by the acquiring unit 101 and map information. The map information is information such as road shape information consisting of nodes and links, and image data drawn with the use of features related to facilities, roads, and other geographic features (mountains, rivers, land).

For example, the position identifying unit 102 identifies the current position of the mobile object on a road by executing a map matching process to correct an estimated current position, which is the current position of the mobile object calculated from signals received from GPS satellites and values output from sensors, or identifies the estimated current position directly as the current position of the mobile object at a place other than on a road.

The map matching process is a process of comparing the road shape data with position information, a traveling direction, a traveling distance, etc., of the mobile object to correct the position of the mobile object on a road if it is determined the mobile object is traveling on the road.

The destination setting unit 103 receives input from a user to set a destination. The destination setting unit 301 can set a parking lot position registered in the storage unit 108 as the destination. Specifically, for example, a user may operate an input unit not shown to input the name of a place or the address of a destination or may plot and input the destination on a map displayed on a displaying unit not shown. The destination is not only a final destination that a user wants to ultimately arrive at and for example, may be a destination that is via-point passed on the way.

The route searching unit 104 searches for a route based on the destination set by the destination setting unit 103. When a route is searched for based on a destination such as final destination and via-point destination as described above, if an entrance point of a parking lot of the destination is registered in the storage unit 108, a route to the entrance point of the parking lot is retrieved. For example, when the current position of the mobile object is specified within a parking lot (a place other than a road and within a predetermined range from a point) of a point having a parking lot exit point registered (a point previously set as a destination), if a destination is set by the destination setting unit 103, the route searching unit 104 searches for a route based on the destination taking into account the exit point of the parking lot.

The route guidance unit 105 performs the route guidance for the mobile object based on the route retrieved by the route searching unit 104. The route guidance unit 105 generates real-time route guidance information based on the route retrieved by the route searching unit 104, the current position of the mobile object specified by the position identifying unit 102, and the map information, for example.

The parking determining unit 106 determines whether the mobile object is parked. Specifically, for example, if the current position of the mobile object identified to be on a road is subsequently identified to be at a place other than a road by the position identifying unit 102, the parking determining unit 106 determines whether the mobile object is parked.

Parking as used herein means a state in which the current position of the mobile object does not change (e.g., for five minutes), for example. With regard to the determination of whether the mobile object is parked, the parking determining unit 106 determines that the mobile object is parked if, from the traveling state information, it is detected that the current position of the mobile object does not change while at a place that is not on a road for a predetermined time.

The parking determining unit 106 may determine that the mobile object is parked if it is detected from the traveling state information and the map information that the current position of the mobile object identified to be at a place other than a road is within a range of a parking lot recorded in the map information. The parking determining unit 106 may also determine that the mobile object is parked if it is detected that a drive source of the mobile object is stopped.

After the current position of the mobile object identified to be on a road within a first predetermined range from the destination is subsequently identified to be at a place other than a road by the position identifying unit 102, if the parking determining unit 106 determines that the mobile object is parked, the registering unit 107 registers into the storage unit 108, a deviation point from the road as an entrance point of a parking lot of the destination. The deviation point is the last current position of the mobile object identified to be on the road by the position identifying unit 102 when the mobile object deviates from the road to a place other than a road.

After the entrance point of the parking lot is registered, if the current position of the mobile object identified to be at a place other than a road is subsequently identified to be on a road, the registering unit 107 may register into the storage unit 108, a returning point onto the road as an exit point of the parking lot. The returning point is the first current position of the mobile object identified to be on a road by the position identifying unit 102 when the mobile object returns onto a road from a place other than a road. The entrance point and the exit point of the parking lot may be correlated and registered.

When the current position of the mobile object identified to be on a road is subsequently identified to be at a place other than a road, the registering unit 107 may temporarily save, without registration, a deviation point in a memory, etc., not shown and when the parking determining unit 106 determines that the mobile object is parked, the registering unit 103 may register into the storage unit 108, the temporarily saved deviation point as an entrance point of the parking lot.

While the route guidance unit 105 is performing route guidance, the registering unit 107 registers only the most recent deviation point for one destination as the entrance point of the parking lot of the one destination. That is, for example, if a "point A" is set as one destination, the registering unit 107 always registers only the most recent deviation point as the entrance point of the parking lot for the "point A" during the route guidance.

While the route guidance unit 105 is performing the route guidance, when the mobile object is identified by the position identifying unit 102 to be on a road within a second predetermined range smaller than the first predetermined range from the destination, if the parking determining unit 106 determines that the mobile object is parked, the registering unit 107 erases the entrance point of the parking lot of the destination registered in the storage unit 108 during the route guidance. In such a situation, it is likely that the registered entrance point of the parking lot of the destination has been registered wrongly before the mobile object is parked on the road within the second predetermined range from the destination during the route guidance. That is, it is likely that the registered position is an entrance point of a parking lot other than that of the destination. Therefore, in such a situation, the entrance point of the destination parking lot registered in the storage unit 108 during the route guidance is erased.

Specifically, assuming that the first predetermined range is a "circular area 1" with a radius of 500 m from the destination and that the second predetermined range is a "circular area 2" with a radius of 100 m from the destination, if the current position of the mobile object is identified to be on the road within the "circular area 2" and it is determined that the mobile object is parked during route guidance, the registering unit 107 erases the entrance point of the destination parking lot registered during this route guidance.

The predetermined ranges (the first and second predetermined ranges) are set according to a category of the destination and may be direct distances or distances along a road to the destination from the place where it is determined that the mobile object is parked. A category of the destination is a classification according to the type of the destination and respective predetermined ranges are set for, for example, a large facility such as an amusement park and a small facility such as a convenience store.

While the route guidance unit 105 is performing the route guidance, after the entrance point of the destination parking lot is registered, if the current position of the mobile object identified to be at a place other than a road is subsequently identified to be on a road by the position identifying unit 102, the registering unit 107 registers into the storage unit 108, a returning point onto the road as an exit point of the destination parking lot and registers only the most recent returning point for one destination as the exit point of the parking lot of the one destination as described above.

While the route guidance unit 105 is performing the route guidance, when the mobile object is identified by the position identifying unit 102 to be on a road within the second predetermined range smaller than the first predetermined range from the destination, if the parking determining unit 106 determines that the mobile object is parked, the registering unit 107 erases the entrance point and the exit point of the parking lot of the destination registered in the storage unit 108 during the route guidance. In such a situation, it is likely that the registered entrance and exit points of the parking lot of the destination have been registered wrongly before the mobile object is parked on the road within the second predetermined range from the destination during the route guidance. That is, it is likely that the registered positions are an entrance point and an exit point of a parking lot other than that of the destination. Therefore, in such a situation, the entrance point and the exit point of the destination parking lot registered in the storage unit 108 during the route guidance are erased.

If the parking determining unit 106 determines that the mobile object is not parked, the registering unit 107 does not register the temporarily saved deviation point as an entrance point of the destination parking lot in the storage unit 108. As described above, even if the current position of the mobile object is identified to be at a place other than a road by the position identifying unit 102, when the parking determining unit 106 determines that the mobile object is not parked, an entrance point of the destination parking lot is not registered.

Therefore, when it is determined that a deviation point is not an entrance point of a parking lot of the destination, such as in a case where the current position of the mobile object returns onto a road immediately after the current position of the mobile object is identified to be at a place other than a road, an incorrect registration of the entrance point of the parking lot can be prevented. That is, incorrect registration can be prevented such as registration of an entrance point of a parking lot at a place that is not a parking lot, and an entrance point of a parking lot can be registered more accurately.

The storage unit 108 temporarily or permanently stores the above deviation and returning points as entrance and exit points of parking lots. The storage unit 108 stores other various items of information such as map information used in navigation processes.

Position Registering Process Details of Navigation Apparatus

Figure 2:
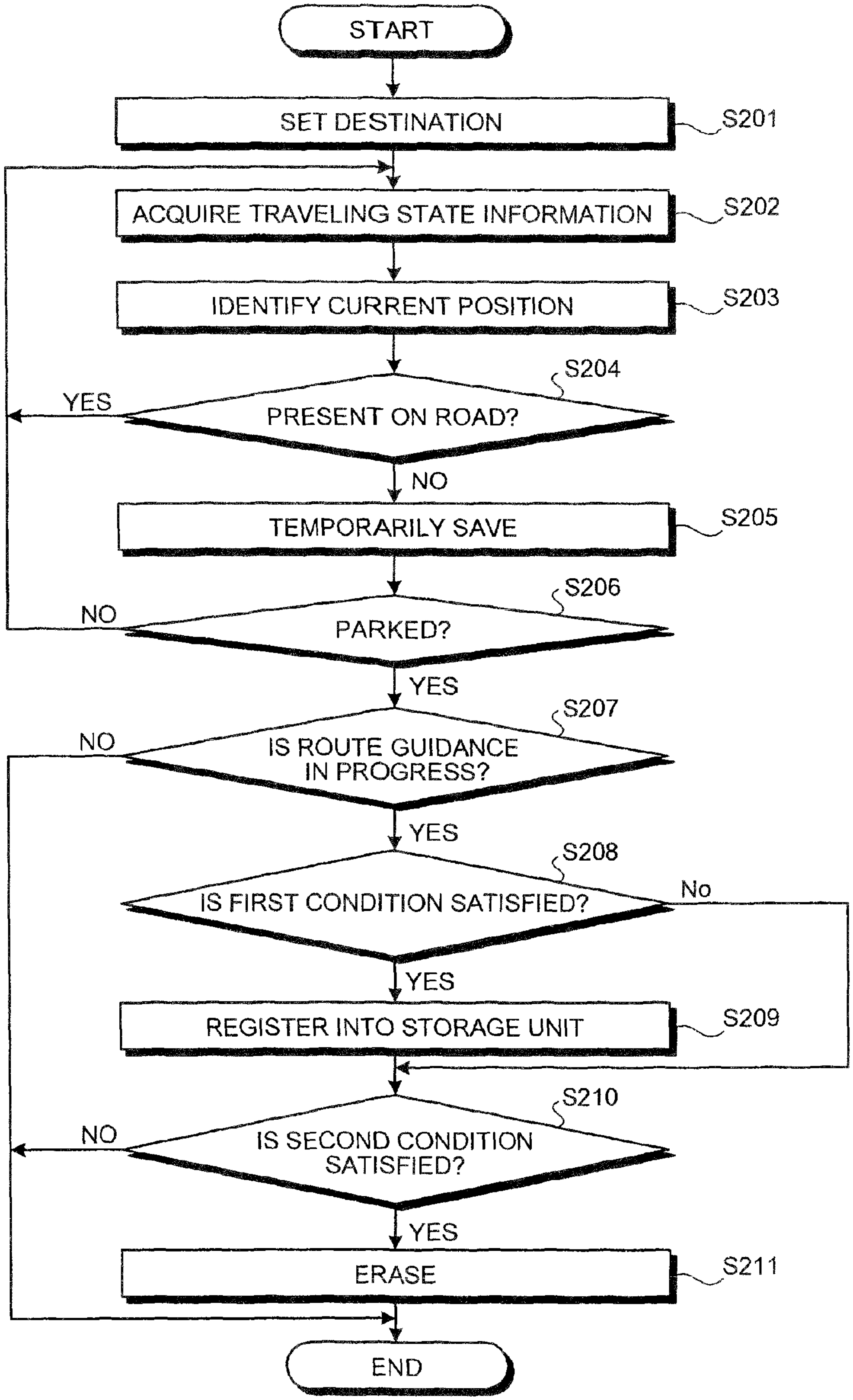
FIG. 2 is a flowchart of an example of the position registering process performed by the navigation apparatus according to the embodiment.

Details of the position registering process performed by the navigation apparatus according to the present invention are described. FIG. 2 is a flowchart of an example of the position registering process performed by the navigation apparatus according to the embodiment.

As shown in the flowchart of FIG. 2, the destination setting unit 103 sets a destination (step S201). For example, the destination is set by a user manipulating an input unit, not shown, to input the name of a place or the address of a destination.

The acquiring unit 101 acquires traveling state information indicating the traveling state of a mobile object (step S202). The traveling state information acquired by the acquiring unit 101 is information including position information, velocity information, traveling direction information, etc., of the mobile object.

The position identifying unit 102 identifies the current position of the mobile object, based on the traveling state information and map information (step S203). The current position of the mobile object identified by the position identifying unit 102 may be, for example, an estimated current position calculated from signals received from GPS satellites and values output from various sensors, or a current position obtained by correcting the estimated current position with the map matching process.

A determining unit, not shown, of the navigation apparatus 100 determines whether the current position of the mobile object is on a road (step S204). If it is determined that the current position of the mobile object is on a road (step S204: YES), the process goes to step S202. On the other hand, if it is determined that the current position of the mobile object is not on a road (step S204: NO), a deviation point from the road is saved in a memory unit, not shown, of the navigation apparatus 100 (step S205).

The parking determining unit 106 determines whether the mobile object is parked if the current position of the mobile object is identified to be at a place other than on a road (step S206). Whether the mobile object is parked is determined with the use of the traveling state information, for example. Specifically, for example, when the current position of the mobile object is identified to be at a place other than on a road, if the current position of the mobile object does not change for five minutes, it is determined that the mobile object is parked.

If it is determined that the mobile object is not parked (step S206: NO), the process goes to step S202 above. If it is determined that the mobile object is parked (step S206: YES), the determining unit not shown of the navigation apparatus 100 determines whether the route guidance unit 105 is performing the route guidance, i.e., whether the route guidance is in progress (step S207).

If it is determined that the route guidance is not in progress (step S207: NO), a sequence of the process is terminated. On the other hand, if it is determined that the route guidance is in progress (step S207: YES), the determining unit, not shown, of the navigation apparatus 100 determines whether a first condition is satisfied (step S208). The first condition of this case is, for example, a condition that the deviation point temporarily saved at step S205 above is within the first predetermined range from the destination.

If it is determined that the first condition is satisfied (step S208: YES), the registering unit 107 registers only the most recent deviation point as an entrance point of the parking lot of the destination (step S209). The determining unit, not shown, of the navigation apparatus 100 determines whether a second condition is satisfied (step S210). If it is determined that the first condition is not satisfied (step S208: NO), the process also goes to step S210. The second condition is, for example, a condition that the parking position of the mobile object (the current position of the mobile object when the mobile object is parked at step S206) is located on a road within the second predetermined range from the destination.

If it is determined that the second condition is not satisfied (step S210: NO), a sequence of the process is terminated. If it is determined that the second condition is satisfied (step S210: YES), the registering unit 107 erases the entrance point of the parking lot of the destination registered in the storage unit 108 during the route guidance (step S211) and a sequence of the process of this flowchart is terminated.

When the route guidance is continuously performed after the entrance point of the destination parking lot is registered at step S209, if the current position of the mobile object identified to be at a place other than a road is subsequently identified to be on a road by the position identifying unit 102, the registering unit 107 may register only the most recent returning point onto this road as the exit point of the destination parking lot into the storage unit 108. When the exit point of the parking lot is registered as described above during the route guidance, if it is determined at step S210 that the second condition is satisfied (step S210: YES), the exit point is erased at step S211 along with the entrance point of the destination parking lot registered in the storage unit 108 during the route guidance.

As described above, according to the navigation apparatus according to the embodiment, only the most recent deviation point within the first predetermined range from the destination can be registered as the entrance point of the parking lot to automatically register a more appropriate entrance point of the parking lot.

When the current position of the mobile object is identified to be on a road within the second predetermined range smaller than the first predetermined range from the destination, if it is determined that the mobile object is parked, the entrance point of the destination parking lot registered during the route guidance can be erased to automatically erase the wrongly registered entrance point of the destination parking lot.

During the route guidance, after the entrance point of the destination parking lot is registered, a returning point onto a road can be registered as an exit point of the destination parking lot and only the most recent returning point can be registered as the exit point of the destination parking lot to automatically register a more appropriate exit point of the parking lot. When the current position of the mobile object is identified to be on a road within the second predetermined range smaller than the first predetermined range from the destination, if it is determined that the mobile object is parked, the exit point of the destination parking lot registered during the route guidance can be erased to automatically erase the wrongly registered exit point of the destination parking lot.

An example according to the embodiment of the present invention is described in detail. The description is made by exemplarily illustrating a case where the navigation apparatus according to the embodiment is applied to a vehicle (including four-wheel vehicles and two-wheel vehicles) to recognize an entrance/exit of a parking lot of a destination.

Hardware Configuration of Navigation Apparatus

Figure 3:
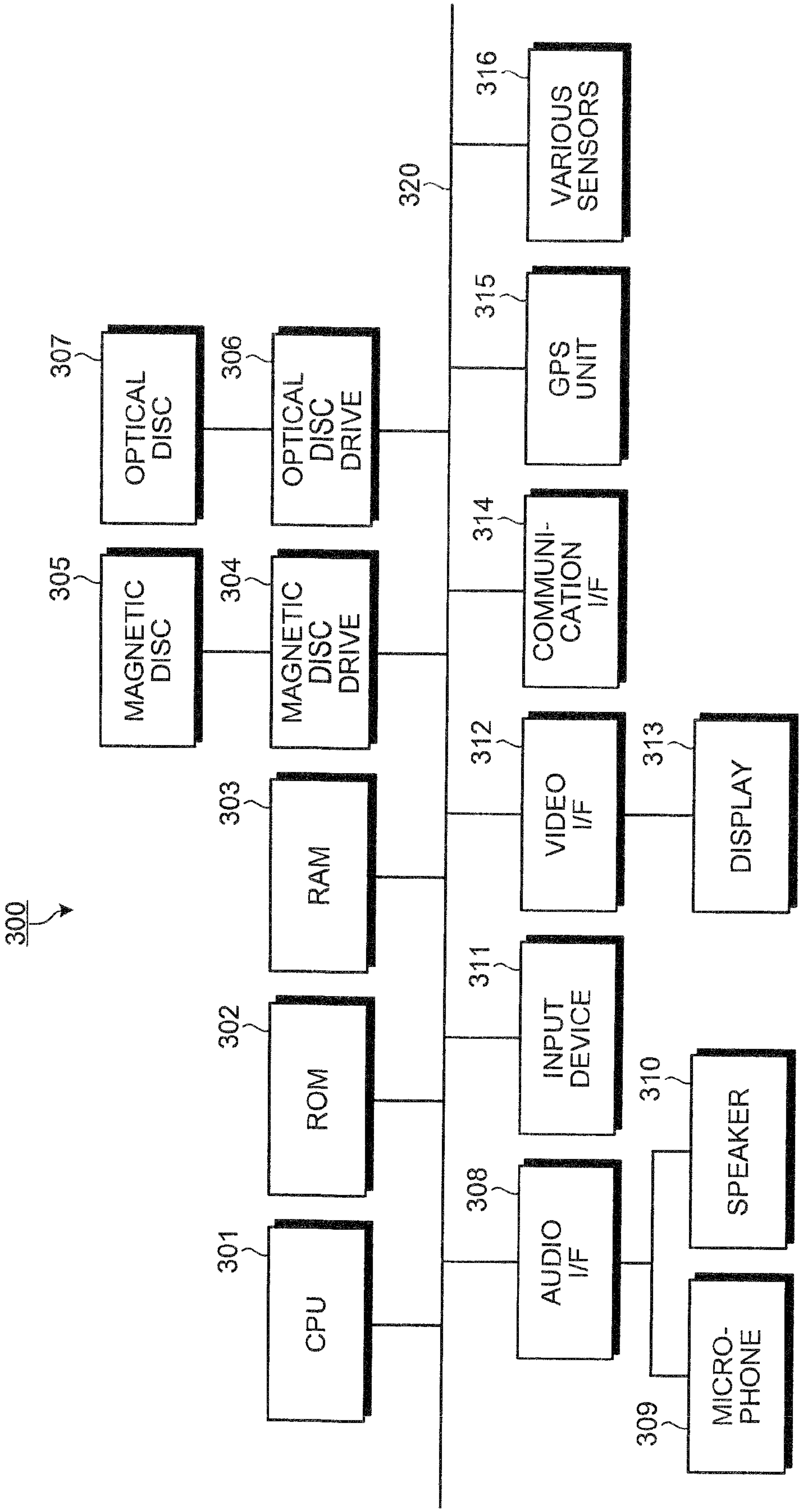
FIG. 3 is a block diagram of a hardware configuration of the navigation apparatus according to the example of the present invention.

A hardware configuration is described for a navigation apparatus according to an example of the present invention. FIG. 3 is a block diagram of a hardware configuration of the navigation apparatus according to the example of the present invention.

As shown FIG. 3, the navigation apparatus 300 includes, respectively connected through a bus 320, a CPU 301, a ROM 302, a RAM 303, a magnetic disc drive 304, a magnetic disc 305, an optical disc drive 306, an optical disc 307, an audio I/F (interface) 308, a microphone 309, a speaker 310, an input device 311, a video I/F (interface) 312, a display 313, a communication I/F (interface) 314, a GPS unit 315, and various sensors 316.

The CPU 301 governs overall control of the navigation apparatus 300. The ROM 302 stores therein various programs such as a boot program, a current-position calculating program, a current-position identifying program, a route retrieval program, a route guidance program, a sound generating program, a map-information display program, a communication program, a database generating program, a data analysis program, and a position recording program.

The current-position calculating program causes the current position of the vehicle (the current position of the navigation apparatus 300) to be calculated based on output information concerning the GPS unit and the various sensors 316 described later.

The current-position identifying program causes the current position of the vehicle to be identified on a road or at a place other than a road based on the current position (estimated current position) calculated by executing the current-position calculating program and the road shape data of the map information recorded on the magnetic disc 305 described later.

The route retrieval program causes, for example, the optimum route from a start point to a destination to be retrieved with the use of the map information, etc., recorded on the magnetic disc 305 described later. The optimum route is the shortest (or fastest) route to the destination or a route most satisfying a condition specified by a user. A route (guide route) retrieved by executing the route retrieval program is output to the audio I/F 308 or the video I/F 312 though the CPU 301, for example.

The route guidance program causes route guidance information to be generated in real time based on guide route information retrieved by executing the route retrieval program, position information indicating the current position of the vehicle identified by executing the current-position identifying program, and the map information recorded on the magnetic disc 305 described later. The route guidance information generated by executing the route guidance program is output to the audio I/F 308 or the video I/F 312 though the CPU 301, for example.

The sound generating program causes information to be generated for tones and sounds corresponding to sound patterns. That is, audio guidance information corresponding to guidance points is caused to be generated based on the route guidance information generated by executing the route guidance program. The generated audio guidance information is output to the audio I/F 308 though the CPU 301, for example.

The map-information display program causes a display format of the map information that is displayed on the display 313 by the video I/F 312 to be determined and causes the map information to be displayed on the display 313 in the determined format.

The position recording program causes the entrance point or the exit point from the parking lot of the destination to be recognized with the use of the current position identified by the current-position identifying program and the map information recorded on the magnetic disc 305 described later. The recognized entrance point or exit point from the parking lot of the destination is caused to be recorded in a recording medium such as the magnetic disc 305 and the optical disc 307 described later or a memory not shown.

The RAM 303 is used as a work area of the CPU 301, for example.

The magnetic disc drive 304 controls the reading/writing of data from/to the magnetic disc 305 under the control of the CPU 301. The magnetic disc 305 stores thereon the data written under the control of the magnetic disc drive 304. The magnetic disc 305 may be an HD (hard disc) or an FD (flexible disc), for example.

An example of information recorded on the magnetic disc 305 includes map information used for route retrieval/route guidance. The map information includes background data representing features such as buildings, rivers, and ground surfaces, and road shape data representing shapes of roads. The map information is depicted two-dimensionally or three-dimensionally on the display 313. During the route guidance by the navigation apparatus 300, a vehicle mark acquired by the GPS unit 315 to indicate the current position of the vehicle is superimposed on the map information and displayed.

The road shape data also includes traffic condition data. The traffic condition data includes, for example, information concerning the presence of a traffic light, a crosswalk, entrances/exits and junctions of expressways for nodes, and lengths (distances) of links, road widths, direction of travel, road types (such as expressway, toll road, general road), etc., for links.

Among the traffic condition data, information concerning past traffic congestion is stored as past traffic congestion information after statistical processing based on season, day of the week, long holiday seasons, the time of day, etc. Although the navigation apparatus 300 acquires, for example, information concerning current traffic congestion from road traffic information received by the communication I/F 314 described later, the past traffic congestion information can be used to forecast congestion at a specified time of day, for example.

Although the map information is recorded on the magnetic disc 305 in this example, of course, the map information may be recorded on the optical disc 307 described later. The map information is not limited to being recorded in the constituent units integrally provided among the hardware of the navigation apparatus 300 and may be provided externally from the navigation apparatus 300. In this case, the navigation apparatus 300 may acquire the map information through the communication I/F 314 via a network. The map information acquired in this way is stored in the RAM 303, for example.

The optical disc drive 306 controls the reading/writing of data from/to the optical disc 307 under the control of the CPU 301. The optical disc 307 is a removable recording medium and data is read from the optical disc 307 under the control of the optical disc drive 306. A writable recording medium can be utilized for the optical disc 307. The removable recording medium can be a medium other than the optical disc 307, such as an MO and a memory card.

The audio I/F 308 is connected to the microphone 309 for audio input and the speaker 310 for audio output. Sound received by the microphone 309 is A/D-converted within the audio I/F 308. The speaker 310 may be disposed on the inside of the vehicle and/or on the outside of the vehicle. The speaker 310 outputs sound based on audio signals from the audio I/F 308. The sound input from the microphone 309 can be recorded as audio data on a recording medium such as the magnetic disc 305, the optical disc 307, or on a memory not shown.

The input device 311 includes a remote controller including keys for entering characters, numeric values, and various instructions, a keyboard, a mouse, a touch panel, etc.

The video I/F 312 is connected to the display 313. Specifically, the video I/F 312 includes, for example, a graphic controller that generally controls the display 313, a buffer memory such as VRAM (Video RAM) that temporarily stores immediately displayable image information, and a control IC that controls the display 313 based on image data output from the graphic controller.

The display 313 displays icons, cursors, menus, windows, or various data such as text and images. For example, a CRT, a TFT liquid crystal display, a plasma display, etc., can be employed as the display 313.

The communication I/F 314 is wirelessly connected to a network and functions as an interface between the navigation apparatus 300 and the CPU 301. Further, the communication I/F 314 is wirelessly connected to a communication network such as the internet and functions as an interface between the CPU 301 and the communication network.

The network includes a LAN, a WAN, a public line network, a portable telephone network, etc. Specifically, the communication I/F 314 includes, for example, an FM tuner, a VICS (Vehicle Information and Communication System: registered trademark)/beacon receiver, a radio navigation apparatus, and other navigation devices, and acquires the road traffic information distributed from VICS centers and concerning for example congestion and traffic regulations.

The GPS unit 315 receives signals from GPS satellites and outputs information indicating the current position of the vehicle. The information output by the GPS unit 315 is used along with values output from the various sensors 316, described later, when the CPU 301 calculates the current position (estimated current position) of the vehicle. The information indicating the current position is information identifying one point on the map information, for example, latitude/longitude and altitude.

The various sensors 316 output information that can be used to determine the position and behavior of the vehicle, including a vehicle speed sensor, an acceleration sensor, and an angular speed sensor. The values output by the various sensors 316 are used by the CPU 301 to calculate the current position (estimated current position) of the vehicle and to measure variations in velocity and direction.

The various sensors 316 include a sensor that detects vehicle operations by a driver. The vehicle operations detected may include steering operations, input for turn signals, the opening/closing of vehicle doors, the turning on/off of the engine (or the on/off of ACC power source), etc.

Specifically, with regard to the functional constituent elements of the position registering apparatus 100 shown in FIG. 1, i.e., the acquiring unit 101, the position identifying unit 102, the parking determining unit 106, and the registering unit 107, the functions thereof are implemented by the CPU 301, the magnetic disc 305, the UPS unit 315, and the various sensors 316, for example.

Specifically, the function of the destination setting unit 301 of the navigation apparatus 100 shown in FIG. 1 is implemented by, for example, the input device 411, and the functions of the route searching unit 402 and the route guidance unit 105 are implemented by the CPU 301 executing the route retrieval program and the route guidance program recorded on the ROM 302, etc. Specifically, the function of the storage unit 108 of the navigation apparatus 100 shown in FIG. 1 is implemented by, for example, the ROM 302 and the RAM 303.

Position Registering Process of Navigation Apparatus

Figure 4:
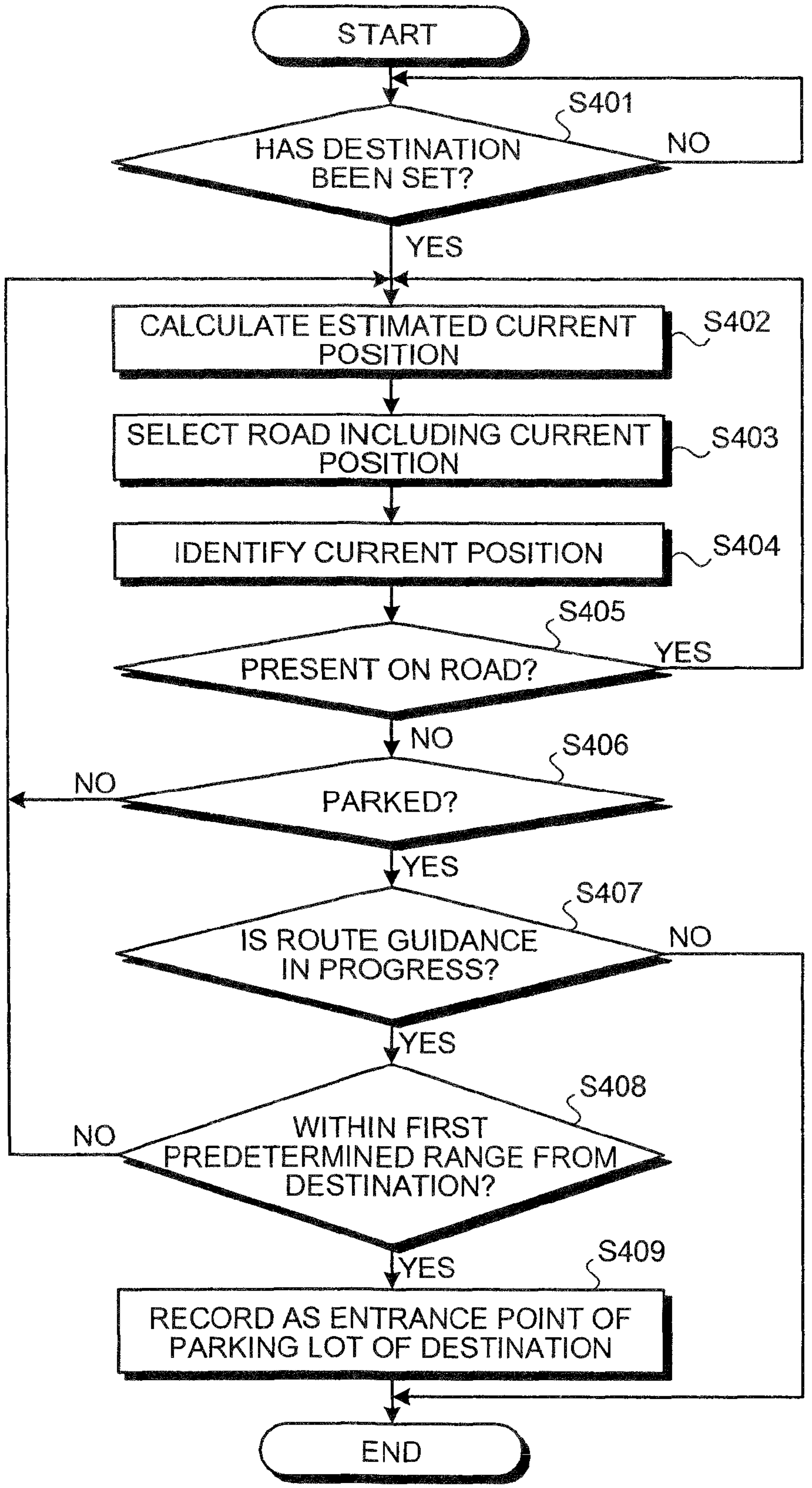
FIG. 4 is a flowchart of an example of the position registering process procedure of the navigation apparatus according to the example of the present invention.

An example of a position registering process of the navigation apparatus 300 according to the example of the present invention is described. FIG. 4 is a flowchart of an example of the position registering process procedure of the navigation apparatus according to the example of the present invention.

As shown in the flowchart of FIG. 4, the navigation apparatus 300 determines whether a destination has been set through the input device 311 (step S401). The destination may be set based on information (input information) input by a user manipulating the input device 311 such as a remote controller, a keyboard, a mouse, and a touch panel to input the name of a place or the address of the destination.

At step S401, waiting occurs until the destination is set (step S401: NO). When the destination is set (step S401: YES), a current position (estimated current position) of the vehicle is calculated based on information output from the GPS unit 315 and the various sensors 316 (step S402). The estimated current position is calculated based on position information indicative of the current position of the vehicle and obtained from the signals received from GPS satellites, vehicle speed information output from the vehicle speed sensor, and vehicle angular speed information (or information concerning the amount of change in the direction of the vehicle) output from the angular speed sensor.

Based on the estimated current position calculated at step S402, a road including the current position of the vehicle is selected (step S403). In the selection of a road, for example, a road closest to the estimated current position is selected as the road including the current position of the vehicle. Alternatively, a direction of a road present within a predetermined range from the estimated current position (road direction) may be compared with the traveling direction of the vehicle to select a road including the current position of the vehicle. If it is determined that the vehicle is not traveling on a road, no selection is made of a road including the current position of the vehicle.

The current position of the vehicle is subsequently identified based on the information concerning the estimated current position calculated at step S402 and the road shape data of the road selected at step S403 (step S404). For example, if a road including the current position of the vehicle is selected at step S403, the map matching process is executed to identify a position corrected by the map matching process as the current position of the vehicle on the road. If a road that includes the current position of the vehicle is not selected at step S403, the estimated current position calculated at step S402 is identified as the current position of the vehicle.

It is determined whether the current position of the vehicle identified at step S404 is on a road (step S405). Specifically, for example, if the current position of the vehicle identified at step S404 is a position corrected onto a road by the map matching process, it is determined that the current position of the vehicle is on a road. If the current position of the vehicle identified at step S404 is the estimated current position calculated at step S402, it is determined that the current position of the vehicle is not on a road. At step S405, if the current position of the vehicle is determined to be on a road (step S405: YES), the process goes to step S402 above.

If it is determined that the current position of the vehicle is not on a road at step S405 (step S405: NO), a deviation point of the vehicle from the road is temporarily saved in a memory, etc., not shown and it is determined whether the vehicle is parked at a place other than the road (step S406). The deviation point is the last current position of the vehicle identified to be on the road. All the deviation points of the vehicle deviated from the road to outside the road may temporarily be saved, or only deviation points located within a predetermined range from the destination may temporarily be saved. If only the deviation points located within the first predetermined range from the destination are temporarily saved, only the most recent deviation point may temporarily be saved, and this deviation point may be recognized and recorded as an entrance point of the parking lot of the destination.

When the deviation point of the vehicle from the road is detected, the deviation point may be detected with the use of traveling path information acquired by recording a traveling path of the vehicle.

With regard to the determination of whether the vehicle is parked, for example, vehicle operations by a driver may be detected by the various sensors 416, etc., to perform the determination based on the detection result. Specifically, for example, if it is determined that the engine of the vehicle is subsequently turned off (or the ACC power source is turned off), it is determined that the vehicle is parked. In a case where the vehicle does not move from the same point for a predetermined period or longer, or where a driver applies the parking brake or changes a shift position to the parking position, it is determined that the vehicle is parked.

If it is determined that the vehicle is not parked (step S406: NO), the process goes to step S402 above. If it is determined that the vehicle is parked (step S406: YES), it is determined whether the route guidance is in progress (step S407). The determination of whether the route guidance is in progress may be performed by determining that the route guidance is in progress if the route guidance program is executed by the CPU 301, for example.

If it is determined that the route guidance is not in progress (step S407: NO), a sequence of the processes of the flowchart is terminated. If it is determined that the route guidance is in progress (step S407: YES), it is determined whether the temporarily saved deviation point is within the first predetermined range from the set destination (step S408). The first predetermined range from the destination is set in accordance with the destination and is a range encompassed by a circle with the destination at a central position, for example. The first predetermined range of the destination may be set in accordance with a category of the destination. For example, if the destination is a large facility such as an amusement park, a range encompassed by a circle with a radius of 1 km may be set, and if the destination is a small facility such as a convenience store, a range encompassed by a circle with a radius of 50 m may be set.

If it is determined that the deviation point is not within the first predetermined range (step S408: NO), the process goes to step S402 above. If it is determined that the deviation point is within the first predetermined range (step S408: YES), this deviation point is recorded onto the recording medium such as the magnetic disc 305 and the optical disc 307 or a memory, etc., not shown (step S409) and a sequence of the processes of the flowchart is terminated. If it is determined that plural deviation points are within the first predetermined range during the route guidance, only the most recent deviation point is recorded as an entrance point of the parking lot of the destination.

An outline of the parking lot entrance point recording process of step S409 is described.

Figure 5:
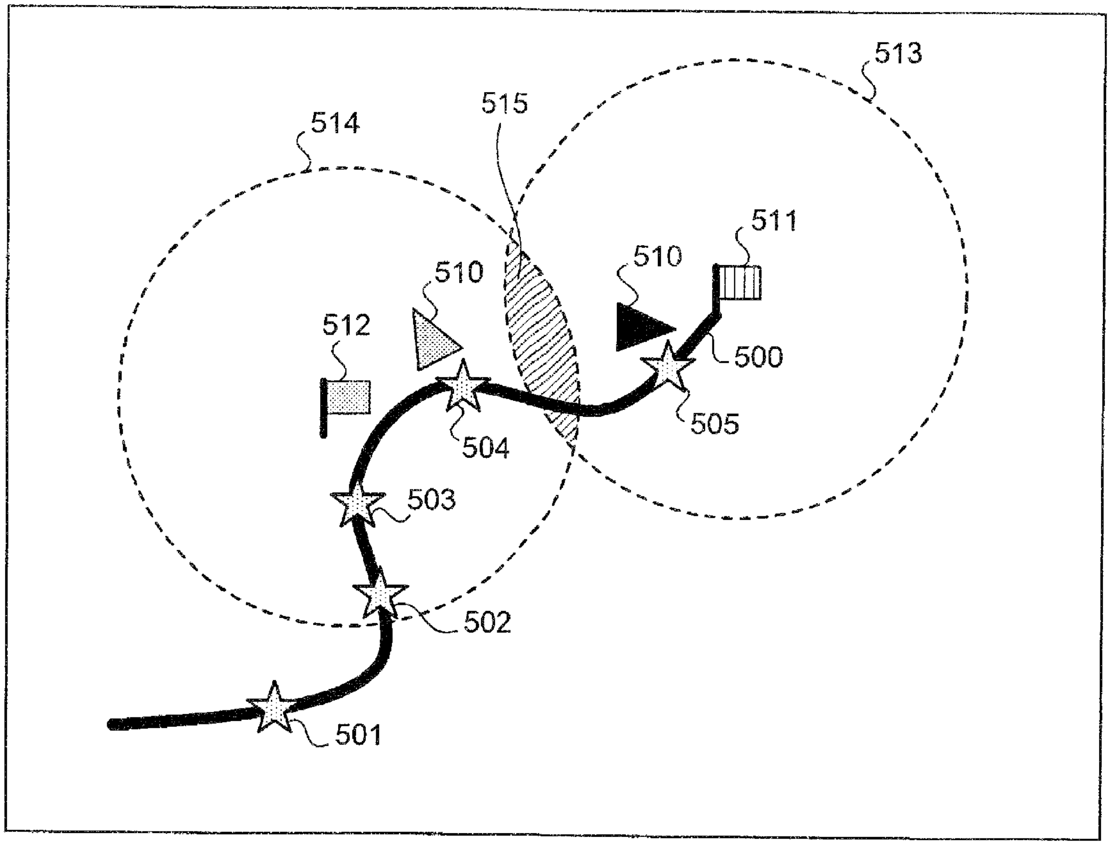
FIG. 5 is a schematic for explaining an outline of a parking lot entrance point recording process.

FIG. 5 is a schematic for explaining an outline of a parking lot entrance point recording process. As shown in FIG. 5, route guidance is performed along a route 500 retrieved by a route search in this case, and a recorded state of a parking lot entrance point is shown for the case where a vehicle 510 moves toward a destination 511. The predetermined ranges (first predetermined ranges) 513 and 514 are set for the destination 511 and a via-point destination 512, respectively.

A deviation point 501 is not within the predetermined ranges 513 and 514 of the destination 511 and the via-point destination 512 and therefore is not recorded as an entrance point of the parking lot of the destination 511 or the via-point destination 512. Deviation points 502, 503, and 504 are within the predetermined range 514 of the via-point destination 512 and therefore are recorded as entrance points of the parking lot of the via-point destination 512 if it is determined that the vehicle 510 is parked after the deviation.

In this case, the deviation points 502 to 504 are recorded such that the most recent position always remains as the entrance point of the parking lot of the via-point destination 512 and, for example, the deviation point 503 remains instead of the deviation point 502, or the deviation point 504 remains instead of the deviation point 503 as the entrance point of the parking lot of the via-point destination 512.

A deviation point 505 is within the predetermined range 513 of the destination 511 and therefore is recorded as an entrance point of the parking lot of the destination 511 if it is determined that the vehicle 510 is parked after the deviation.

For example, if it is determined that the vehicle 510 is parked within a range 515 where the predetermined ranges 513 and 514 overlap, the position may preferentially be recorded as an entrance point of the parking lot of the destination 511, or may be determined to be recorded as an entrance point of either parking lot simply based on respective distances from the destination 511 and the via-point destination 512.

Along with the entrance point of the parking lot recorded in this way, an entering method at the time of entry of the vehicle into the parking lot may also be correlated and recorded with the entrance point of the destination parking lot onto the recording medium such as the magnetic disc 305 and the optical disc 307 or a memory, etc., not shown. The entering method is information indicating how the vehicle enters into the parking lot entrance from a road and may be information indicating that the vehicle can turn right, turn left, or go straight to enter the parking lot entrance from a road, for example.

The entering method may be determined with the use of the position information indicating the current position of the vehicle specified at step S404, the output values from the various sensors 316, and the map information, for example. Specifically, position information indicating the current position of the vehicle, the traveling direction of the vehicle, and the road shape data of the road of the traveling vehicle are utilized to determine, for example, that the vehicle turns right to enter the parking lot entrance. Steering operations, etc., performed by a driver may be detected to determine what degree of angle is formed relative to the direction of the road when entering the parking lot entrance.

If the type of the parking lot is determined with the use of the position information indicating the current position of the vehicle specified at step S404, the values output from the various sensors 316, the map information, etc., the type of the parking lot may be correlated and recorded with the destination parking lot.

The type of the parking lot may be information indicating an indoor parking lot or an outdoor parking lot (multilevel parking lot/underground parking lot), for example. When determining the type of the parking lot, for example, if the sensitivity does not change in the radio waves from the GPS satellites received by the GPS receiver, it is determined that the parking lot is an outdoor parking lot. For example, if the radio waves cannot be received from the GPS satellites located in a vertical direction or if it is detected that the mobile object goes up a slope, it is determined that the parking lot is a multilevel parking lot. For example, if the reception sensitivity of the radio waves does not exceed a threshold value or if it is detected that the mobile object goes down a slope, it is determined that the parking lot is an underground parking lot. The number of turns made by the vehicle within the parking lot may be measured by the various sensors 316 to determine the number of levels of the parking lot.

As described above, various pieces of information correlated and recorded with the entrance point of the destination parking lot may be displayed along with the parking lot information on the display 313 and presented to a driver when the driver searches for a destination, for example.

After the entrance point of the destination parking lot is recorded at step S409 above, if the current position of the vehicle identified to be at a place other than a road is subsequently identified to be on a road, the returning point onto the road may be recorded as an exit point of the destination parking lot onto the recording medium such as the magnetic disc 305 and the optical disc 307 or a memory, etc., not shown. The returning point is the first current position of the vehicle identified to be on a road when the vehicle returns onto a road from a place other than a road.

Along with the exit point of the parking lot, an exiting method at the time of exiting of the vehicle from the parking lot may also be correlated and recorded with the entrance point of the destination parking lot onto the recording medium such as the magnetic disc 305 and the optical disc 307 or a memory, etc., not shown. The exiting method from the parking lot exit is information indicating how the vehicle exits from the parking lot exit onto a road and may be information indicating that the vehicle can turn right, turn left, or go straight to exit from the parking lot onto a road, for example.

The exiting method may be determined with the use of the position information indicating the current position of the vehicle, the output values from the various sensors 316, the map information, etc. Specifically, position information indicating the current position of the vehicle, the traveling direction of the vehicle, and the road shape data of the road of the traveling vehicle are utilized to determine whether the vehicle turns right to return on the road or turns left to return on the road, for example.

When the route search is performed for a destination having a parking lot entrance point recorded, a route to the parking lot entrance point of the destination can be searched for. If the entering method into the parking lot entry is also recorded, a route taking into account the entering method can be retrieved. For example, if the recorded entering method indicates that the vehicle can turn left to enter the parking lot entrance, a route is searched for that enables the vehicle to turn left and enter the parking lot entrance.

When a route is searched for from the inside of a parking lot (a place other than a road and within a predetermined range from a point) of a point having a parking lot exit point recorded (a point previously set as a destination) to an arbitrary destination, a route taking into account the exit point of the parking lot of the point can be searched for. If the exiting method from the parking lot exit is also recorded, a route taking into account the exiting method can be searched for. For example, if the recorded exiting method indicates that the vehicle can turn left from the parking lot exit to return onto a road, a route of turning left to exit the parking lot is retrieved.

An outline is described for a process of erasing the recorded entrance point of the parking lot of the destination 511 when the route guidance is further continued after the deviation point is recorded as the entrance point of the parking lot of the destination with the process above.

Figure 6:
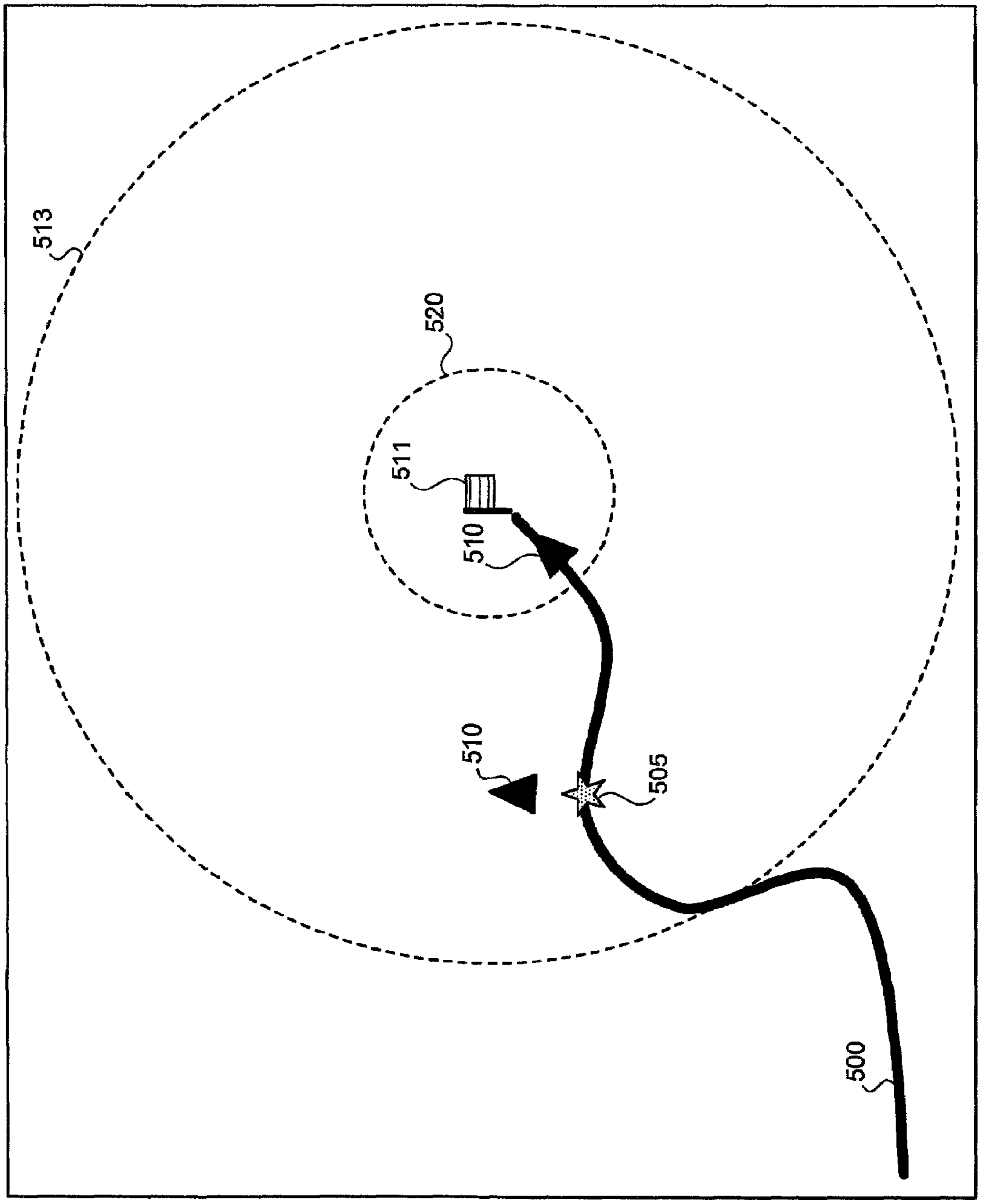
FIG. 6 is a view for explaining an outline of the parking lot entrance point erasing process.

FIG. 6 is a view for explaining an outline of the parking lot entrance point erasing process. As shown in FIG. 6, route guidance is performed along the route 500 retrieved by a route search, and the vehicle 510 is parked on a road within another predetermined range (a second predetermined range) 520 described later in this case. The predetermined range (first predetermined range) 513 and the other predetermined range (second predetermined range) 520 smaller than the predetermined range 513 are set for the destination 511.

In this case, the vehicle 510 is parked with the current position of the vehicle identified to be on a road within the other predetermined range (second predetermined range) 520 and, therefore, the deviation point 505 already registered due to the parking of the vehicle 510 within the predetermined range (first predetermined range) 513 has been registered wrongly as and entrance point of the parking lot of the destination 511. Therefore, the deviation point 505 recorded as an entrance point of the parking lot of the destination 511 during the route guidance is erased.

When the route guidance is performed along the route 500 retrieved by the route search, if an exit point of the parking lot of the destination 511 is recorded before the vehicle 510 is parked on a road within the other predetermined range (second predetermined range) 520, the exit point is also erased along with the entrance point (deviation point 505) recorded as the entrance point of the parking lot of the destination 511.

As described above, according to this example, if it is determined that the vehicle 510 during the route guidance is parked outside a road within the predetermined range (first predetermined range) 513 from the destination 511, the navigation apparatus 300 can record only the most recent deviation point as the entrance point of the parking lot of the destination 511 to automatically record a more appropriate entrance point of the parking lot.

If it is determined that the vehicle 510 is parked when the current position of the vehicle is identified to be on a road within the other predetermined range (second predetermined range) 520 smaller than the predetermined range (first predetermined range) 513 from the destination 511, the entrance point of the parking lot of the destination 511 recorded during the route guidance can be erased to automatically erase the wrongly recorded entrance point of the parking lot of the destination 511.

During the route guidance, after the entrance point of the parking lot of the destination 511 is recorded, a returning point onto a road can be registered as an exit point of the parking lot of the destination and only the most recent returning point can be registered as the exit point of the parking lot of the destination 511 to automatically register a more appropriate exit point of the parking lot. When the current position of the vehicle 510 is identified to be on a road within the other predetermined range (second predetermined range) 520 smaller than the predetermined range (first predetermined range) 513 from the destination 511, if it is determined that the vehicle 510 is parked, the exit point of the parking lot of the destination 511 recorded during the route guidance can be erased to automatically erase the wrongly recorded exit point of the parking lot of the destination.

The navigation apparatus 300 can record and correlate the entering method to the parking lot entrance, the exiting method from the parking lot exit, and a category of the parking lot with the entrance point and the exit point of the parking lot of the destination 511 (or the via-point destination 512). Therefore, for example, when a route to the parking lot of the destination 511 (or the via-point destination 512) is searched for, a route taking into account the entering method into the parking lot entry can be searched for. When a route from the inside of the parking lot of the destination 511 (or the via-point destination 512) to a different destination is searched for, a route taking into account the exiting method from the parking lot exit can be searched for.

As described above, the navigation apparatus 300 can automatically record various pieces of information such as an entrance point and an exit point of a parking lot not preliminarily set in the map information according to a utilization environment of a user and can utilize the various pieces of the recorded information when a user performs a route search, etc. This enables the user to acquire the optimum search results suitable for the use environment, improving convenience for the user.

The position registering method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A navigation apparatus comprising:
an acquiring unit that acquires traveling state information indicating a traveling state of a mobile object;
a position identifying unit that identifies a current position of the mobile object based on the traveling state information and map information;
a destination setting unit that sets a destination;
a route guidance unit that performs route guidance based on a route that is searched for based on the destination;
a parking determining unit that determines that the mobile object is parked; and
a registering unit that registers into a storage unit, a deviation point from a road as an entrance point of a parking lot of the destination when the mobile object is parked outside any road after the mobile object is located on a road within a vicinity of the destination, wherein
the registering unit, for one destination, registers into the storage unit, only a most recent deviation point as the entrance point of the parking lot of the one destination while the route guidance is in progress.

2. The navigation apparatus according to claim 1, wherein the registering unit, while the route guidance is in progress, erases the entrance point of the parking lot of the destination registered in the storage unit during the route guidance if the mobile object is determined to be parked when the mobile object is identified to be on a road within a second predetermined range smaller than the first predetermined range from the destination.

3. The navigation apparatus according to claim 1, wherein the registering unit, while the route guidance is in progress, if the current position of the mobile object identified not to be on any road is subsequently identified to be on a road after the entrance point of the parking lot of the destination is registered, registers into the storage unit, a returning point onto the road as an exit point of the parking lot of the destination and registers only a most recent returning point for the one destination as the exit point of the parking lot of the one destination.

4. The navigation apparatus according to claim 3, wherein the registering unit, while the route guidance is in progress, if the mobile object is determined to be parked when the mobile object is identified to be on a road within a second predetermined range smaller than the first predetermined range from the destination, erases the entrance point and the exit point of the parking lot of the destination registered in the storage unit during the route guidance.

5. A navigation apparatus comprising:
an acquiring unit that acquires traveling state information indicating a traveling state of a mobile object;
a position identifying unit that identifies a current position of the mobile object based on the traveling state information and map information;
a destination setting unit that sets a destination;
a route guidance unit that performs route guidance based on a route that is searched for based on the destination;
a parking determining unit that determines that the mobile object is parked; and
a registering unit that registers into a storage unit, a deviation point from a road as an entrance point of a parking lot of the destination when the mobile object is parked outside any road after the mobile object is located on a road within a vicinity of the destination, wherein
the registering unit, while the route guidance is in progress, erases the entrance point of the parking lot of the destination registered in the storage unit during the route guidance if the mobile object is determined to be parked when the mobile object is identified to be on a road within a second predetermined range smaller than the first predetermined range from the destination.

6. A position registering method of a navigation apparatus including a destination setting unit, and a route guidance unit that performs route guidance based on a route that is searched for based on the destination, the position registering method comprising:
an acquiring step of acquiring via a programmed computer traveling state information indicating a traveling state of a mobile object;
a position identifying step of identifying a current position of the mobile object based on the traveling state information and map information;
a saving step of temporarily saving via a programmed computer a deviation point from a road when the mobile object identified to be on the road is subsequently identified not to be on any road;
a parking determining step of determining via a programmed computer that the mobile object is parked when the mobile object is identified not to be on any road; and
a registering step of registering via a programmed computer the deviation point as an entrance point to a parking lot of the destination when the deviation point is within a vicinity of the destination and the mobile object is parked outside any road, wherein
the registering step includes, for one destination, registering only a most recent deviation point as the entrance point of the parking lot of the one destination while the route guidance is in progress.

7. A position registering method of a navigation apparatus including a destination setting unit, and a route guidance unit that performs route guidance based on a route that is searched for based on the destination, the position registering method comprising:

an acquiring step of acquiring via a programmed computer traveling state information indicating a traveling state of a mobile object;

a position identifying step of identifying via a programmed computer a current position of the mobile object based on the traveling state information and map information;

a saving step of temporarily saving via a programmed computer a deviation point from a road when the mobile object identified to be on the road is subsequently identified not to be on any road;

a parking determining step of determining via a programmed computer that the mobile object is parked when the mobile object is identified not to be on any road; and a registering step of registering via a programmed computer the deviation point as an entrance point to a parking lot of the destination when the deviation point is within a vicinity of the destination and the mobile object is parked outside any road, wherein the registering step includes, while the route guidance is in progress, erasing the entrance point registered in the storage unit during the route guidance if the mobile object is determined to be parked when the mobile object is identified to be on a road within a second predetermined range smaller than the first predetermined range from the destination.

8. A computer-readable recording medium storing therein a position-registering computer program that causes a computer to execute:

an acquiring step of acquiring traveling state information indicating a traveling state of a mobile object;

a position identifying step of identifying a current position of the mobile object based on the traveling state information and map information;

a saving step of temporarily saving a deviation point from a road when the mobile object identified to be on the road is subsequently identified not to be on any road;

a parking determining step of determining that the mobile object is parked when the mobile object is identified not to be on any road; and a registering step of registering the deviation point as an entrance point to a parking lot of the destination when the deviation point is within a predetermined range from the destination and the mobile object is parked outside any road, wherein the registering step includes, for one destination, registering only a most recent deviation point as the entrance point of the parking lot of the one destination while the route guidance is in progress.

9. A computer-readable recording medium storing therein a position-registering computer program that causes a computer to execute:

an acquiring step of acquiring traveling state information indicating a traveling state of a mobile object;

a position identifying step of identifying a current position of the mobile object based on the traveling state information and map information;

a saving step of temporarily saving a deviation point from a road when the mobile object identified to be on the road is subsequently identified not to be on any road;

a parking determining step of determining that the mobile object is parked when the mobile object is not located on any road; and a registering step of registering the deviation point as an entrance point to a parking lot of the destination when the deviation point is within a vicinity of the destination and the mobile object is parked outside any road, wherein the registering step includes, while the route guidance is in progress, progress, erasing the entrance point registered in the storage unit during the route guidance if the mobile object is parked when the mobile object is located on a road within a vicinity smaller than the vicinity of the destination.

* * * * *